UNITED STATES PATENT OFFICE.

WILLIAM T. BAILEY, OF GIRARD, OHIO, ASSIGNOR OF ONE-HALF TO JOHN H. BARRETT, OF GIRARD, OHIO.

MANUFACTURE OF A CEREAL FOOD.

1,165,646.  Specification of Letters Patent.  Patented Dec. 28, 1915.

No Drawing.  Application filed May 25, 1915. Serial No. 30,393.

*To all whom it may concern:*

Be it known that I, WILLIAM T. BAILEY, a citizen of the United States, residing at Girard, in the county of Trumbull and State of Ohio, have invented certain new and useful Improvements in the Manufacture of a Cereal Food, of which the following is a specification.

This invention relates to the process of manufacturing a cereal food.

The object of my invention is to so treat grain, preferably pop-corn, as to make of it a prepared food that may come into general use, rather than the limited use to which it is now put, by making it adaptable as a breakfast food, as an ingredient of icings, etc., in confectionaries, thickening of soups, as a relish upon fruits, and the like.

The prduct made by my process is highly nutritious, extremely palatable in that the flavor is distinctively pleasing and different from the flavor of any other prepared cereal food.

The inventive idea involved is capable of expression in a variety of ways, one of which is herein specifically described, but the specific example given is solely for the purpose of illustrating the invention, and not for the purpose of defining the limits thereof, reference being had to the claims for this purpose.

The process consists of subjecting grain, preferably pop-corn, to the action of the heat of a fire until the shell of the kernal is ruptured by reason of the explosion of the oil content of the grain, thereby turning the grain inside out, and causing the interior suddenly to become efflorescent, cleaning the product by removing all chaff and unpopped grain therefrom; crushing or rolling the same, and then grinding the same to a flake form, a granulated form, or a powdered form.

I claim:

1. The process of manufacturing a prepared cereal food by subjecting grain to the action of heat until the grain becomes efflorescent, removing all foreign matter from the efflorescent portions, crushing said portions, and then grinding the same.

2. The process of preparing a cereal food which consists in subjecting grain to the action of heat until the grain becomes efflorescent, removing all foreign matter from the efflorescent portions, and crushing the said portions.

3. The process of preparing a cereal food which consists in subjecting grain to the action of heat until the grain becomes efflorescent, removing all foreign matter from the efflorescent portions, and grinding the said portions to a granulated form.

4. The process of preparing a cereal food which consists in subjecting grain to the action of heat until the grain becomes efflorescent, removing all foreign matter from the efflorescent portions, and grinding the said portions to a powdered form.

In testimony whereof I affix my signature hereto.

WILLIAM T. BAILEY.

Witnesses:
 WADE R. DUMER,
 JOHN H. BARRETT.